(12) United States Patent
Markus et al.

(10) Patent No.: US 10,318,391 B2
(45) Date of Patent: *Jun. 11, 2019

(54) NON-BLOCKING LISTENER REGISTRATION IN THE PRESENCE OF DATA GRID NODES JOINING THE CLUSTER

(71) Applicant: Red Hat, Inc., Raliegh, NC (US)

(72) Inventors: Mircea Markus, London (GB); William Rosenquist Burns, Annapolis, MD (US)

(73) Assignee: Red Hat, Inc., Raleigh, NC (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/870,316

(22) Filed: Jan. 12, 2018

(65) Prior Publication Data

US 2018/0137018 A1 May 17, 2018

Related U.S. Application Data

(63) Continuation of application No. 14/609,315, filed on Jan. 29, 2015, now Pat. No. 9,892,006.

(Continued)

(51) Int. Cl.
| | |
|---|---|
| *G06F 16/00* | (2019.01) |
| *G06F 11/16* | (2006.01) |
| *G06F 16/28* | (2019.01) |
| *G06F 16/22* | (2019.01) |
| *G06F 16/23* | (2019.01) |

(Continued)

(52) U.S. Cl.
CPC .......... *G06F 11/1662* (2013.01); *G06F 11/00* (2013.01); *G06F 11/0709* (2013.01); *G06F 11/0757* (2013.01); *G06F 11/1658* (2013.01); *G06F 16/2255* (2019.01); *G06F 16/2282* (2019.01); *G06F 16/2291* (2019.01); *G06F 16/2358* (2019.01); *G06F 16/2379* (2019.01); *G06F 16/2455* (2019.01); *G06F 16/24575* (2019.01); *G06F 16/285* (2019.01); *G06F 16/9535* (2019.01); *G06Q 20/102* (2013.01); *G06F 2201/805* (2013.01);

(Continued)

(58) Field of Classification Search
CPC ......................... G06F 17/3033; G06F 16/2379
USPC ....................................................... 707/722
See application file for complete search history.

(56) References Cited

U.S. PATENT DOCUMENTS

| 7,523,500 B1 | 4/2009 | Szor et al. |
| 7,984,043 B1 | 7/2011 | Waas |

(Continued)

OTHER PUBLICATIONS

GitHub, Inc., "Clustered Listeners," https://github.com/infinispan/infinispan/wiki/Clustered-listener, Sep. 25, 2014, 3 pages.

(Continued)

*Primary Examiner* — Chelcie L Daye
(74) *Attorney, Agent, or Firm* — Womble Bond Dickinson (US) LLP; Daniel E. Ovanezian

(57) ABSTRACT

A method of communicating data in a node cluster of a data grid is described. The method includes receiving, at a listener of a first node, data from a second node that is filtered using the filter during a search query of a node cluster. The method further includes determining, at the listener, that a third node has joined the node cluster during the search query. The method further includes communicating the filter the third node joining the node cluster in response to the third node joining the cluster.

20 Claims, 13 Drawing Sheets

Related U.S. Application Data

(60) Provisional application No. 62/073,861, filed on Oct. 31, 2014.

(51) Int. Cl.

| | | |
|---|---|---|
| *G06F 16/2455* | (2019.01) | |
| *G06F 16/9535* | (2019.01) | |
| *G06F 16/2457* | (2019.01) | |
| *G06Q 20/10* | (2012.01) | |
| *G06F 11/00* | (2006.01) | |
| *G06F 11/07* | (2006.01) | |
| G06Q 20/40 | (2012.01) | |
| G06Q 40/02 | (2012.01) | |

(52) U.S. Cl.
CPC ..... *G06F 2201/82* (2013.01); *G06Q 20/4016* (2013.01); *G06Q 40/02* (2013.01)

(56) References Cited

U.S. PATENT DOCUMENTS

| | | |
|---|---|---|
| 9,652,339 B2 | 5/2017 | Markus et al. |
| 2005/0044064 A1 | 2/2005 | Haase |
| 2009/0276654 A1 | 11/2009 | Butterworth et al. |
| 2010/0262871 A1 | 10/2010 | William |
| 2011/0228668 A1 | 9/2011 | Pillai et al. |
| 2014/0108861 A1 | 4/2014 | Abadi et al. |
| 2014/0244578 A1 | 8/2014 | Winkelstraeter |
| 2016/0026667 A1 | 1/2016 | Mukherjee et al. |
| 2016/0124817 A1 | 5/2016 | Markus et al. |
| 2016/0125014 A1 | 5/2016 | Markus et al. |
| 2016/0125086 A1 | 5/2016 | Markus et al. |

OTHER PUBLICATIONS

Oracle Coherence Documentation, Coherence Developer's Guide, "Using Cache Events," http://docs.oracle.com/cd/E15357_01/coh.360/e15723/api_events.htm#COHDG5187, accessed Dec. 1, 2016, 11 pages.

NON-BLOCKING LISTENER REGISTRATION IN THE PRESENCE OF DATA GRID NODES JOINING THE CLUSTER

CROSS-REFERENCE TO RELATED APPLICATION

This application claims the benefit of U.S. application Ser. No. 14/609,315, filed Jan. 1, 2015, which claims the benefit of U.S. Provisional Application No. 62/073,861, filed Oct. 31, 2014, the entire disclosures of which are incorporated herein by reference.

TECHNICAL FIELD

The present disclosure pertains to computer systems; more specifically, to changes of topology of nodes in a data grid.

BACKGROUND

Data, such as software programs, information, or other forms of data, has become a resource and asset for many individuals and businesses. A data grid is a distributed database system within the boundaries of a data center that can store and manage data across multiple nodes, particularly when the amount of data is relatively large. For example, the data grid can be a collection of nodes (e.g., a node cluster) with an increased computing power and storage capacity. The data can be stored at different nodes in a node cluster or at different node clusters. Data grids can provide functionalities such as querying, processing for streaming data, and transaction capabilities.

DESCRIPTION OF EMBODIMENTS

Figure 1:
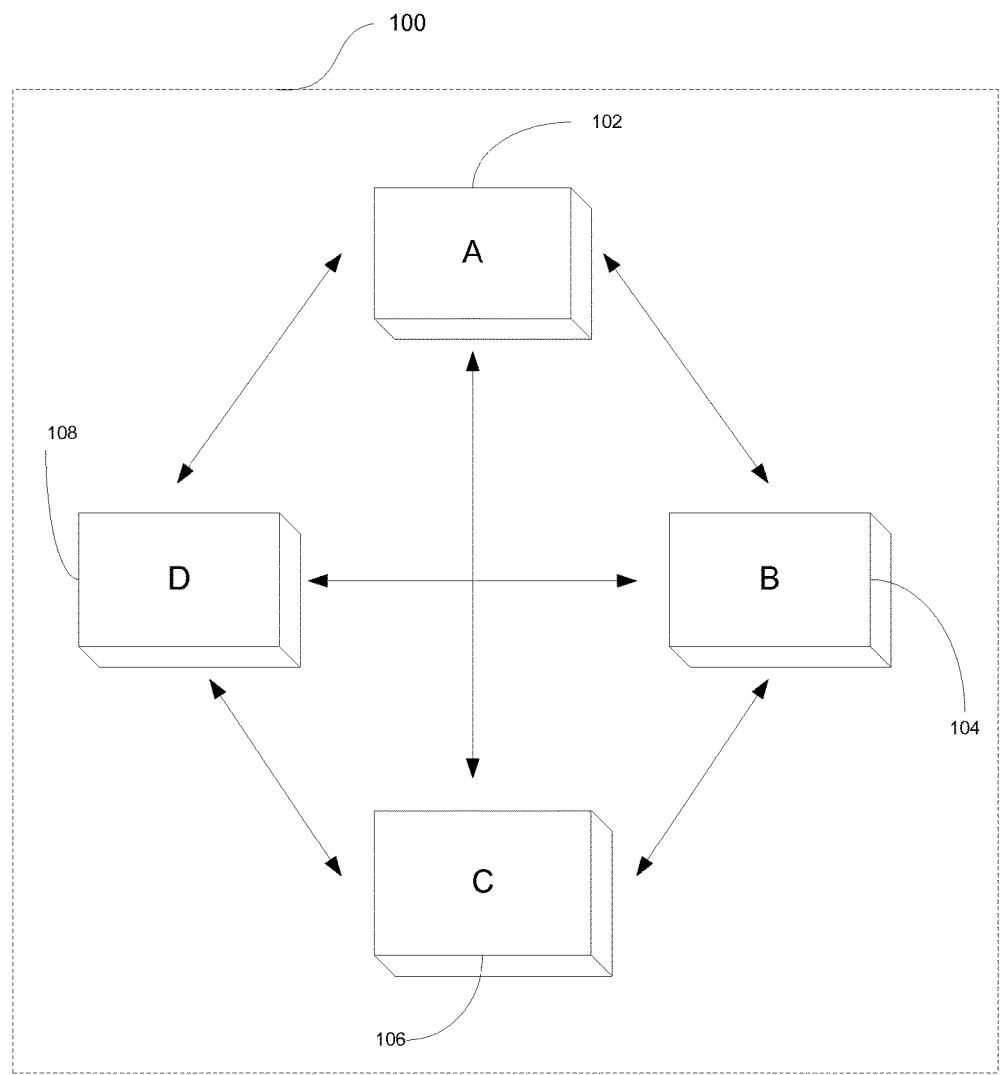
FIG. 1 illustrates a block diagram of nodes in a cluster according to one embodiment.

Data transfer technologies are described herein.

Data is becoming an increasingly important resource and asset to businesses and individuals. Individuals or businesses may store data on a single machine or a single server to provide a fixed and definite location of the data. However, as the amount of data stored and used by individuals and businesses increases, maintaining the data used by that individual or business at a single machine or server can become difficult. In one example, a rate at which data is uploading to a single machine or server in combination with a rate that users access the data can overwhelm a single machine or server. Organizations may use a data grid to store large amounts of data and/or access data owned and stored by multiple organizations. Data grids can manage distributed data, where the data can be stored across multiple locations and multiple types of storage devices. Additionally, a data grid can use a common access method, a common naming scheme, a common authentication method, a common management policy, and so forth. The data grid can be a collection of nodes (e.g., a node cluster), where each node has a memory, such as a cache, for storing data. Storing data at different nodes in a node cluster or different node clusters can provide increased data access rates and data security for the individuals or businesses. A node can be a physical machine, a virtual machine, a computer a server, a collection of physical machines or virtual machines, and so forth. When a user desires to access data in the data grid, an application can query data stored in the data grid using an iteration process, as discussed in more detail in the proceeding paragraphs. As data is queried by the application, the data can be accessed, updated, and/or modified by other applications during the iteration process.

Traditionally, when data is updated or modified at a cache of a node or a topology of a cluster changes (such as a node is removed or added to the cluster or a node crashes), providing up-to-date data to a querying application while the data is being accessed and iterated over can be difficult. In one example, traditionally when a cache entry occurs at a node during an iteration process, the cache entries can be overlooked or sent to the querying application out of order. When data is overlooked, the querying application may not receive an up-to-date data set to analyze and/or provide to a user. When data is sent to a querying application out of order, the querying application may erroneously analyze the out of order data and/or report incorrect information to a user. For example, when the querying application is for a banking application (such as fraud detection or banking account balance querying), missing data or out of order data can cause banking fraud to go undetected or an account balance to be incorrect.

In one example, when the memory of the current nodes in a node cluster is reaching full capacity, a new node may join the node cluster in a data grid. Traditionally, when a query is being performed by iterating through cache entries at the nodes in the node cluster, a new node waits until the iteration process is complete for the current nodes in the cluster before joining the node cluster. The delay in the new node joining the cluster can be problematic as data modifications (such as data writes) can occur during the query and when the memory of the cluster is at full capacity there may be no place to write the new data.

Aspects of the present disclosure address the above noted deficiency by maintaining a queue of when data is updated or modified at a cache of a node during an iteration process and reporting the queued data to the querying application to maintain data order and provide up-to-date data. Maintaining a queue of changes to a cache of a node during the iteration process can track changes that occur at a location in the cache where the entries have already been iterated over during the iteration process and track when the changes occur. For example, a cache entry at the top of a cache may have initially been iterated over and a first value may have sent to a querying application. In this example, during the iteration process the cache entry at the top of the cache can be changed after the data of the cache entry was already sent to the querying application.

A queue can be maintained in order to keep track of when the new data was written, modified, or deleted in the cache. For example, the querying application may be for a bank monitoring an amount that an individual has in their bank account. In this example, as the querying application of the bank iterates over account balance information for the individual, the bank may desire to know when old account balance information was modified and/or when new banking information is added at a cache entry already iterated over at a node. When the node maintains a queue of cache entry writes, modifications, or deletions, the bank can receive the queued information and determine a correct current account balance of the individual.

Additionally, aspects of the present disclosure address the above noted deficiency by enabling a new node to join the node cluster during the iteration process of the query search. The new node can communicate registration information to the other nodes in the cluster to enable the other nodes to update topology information of the node cluster. Additionally, the cluster listener can provide the new node with a filter to enable the new node to communicate memory modification information (such as a modification or entry to a cache) to the cluster listener when the memory modification information is received during the iteration process. The cluster listener can enable a node to continuously or on a periodic basis query the node cluster.

FIG. 1 illustrates a block diagram of nodes 102, 104, 106, and 108 in a cluster 100. The nodes 102, 104, 106, and 108 can include caches for storing data. An instance of a cache at a node can be replicated to another cache node in the cluster 100. In one example, data from a cache of node 102 can be replicated to the caches of nodes 104, 106, and/or 108 regarding the distribution of data in the data cluster, such as where different data sets should be stored or where new data should be entered.

A cache at a node can include multiple cache entries, where each cache entry includes a key and a value pair, i.e. a (key, value) pair. The (key, value) pair can include an identification (ID) value (the key) that is associated with data (the value). For example, the (key, value) pair can be an ID value associated with information about a person, e.g., (ID, Person). The (key, value) pair can be used to perform different functions at nodes in a data grid, such as data reads, data writes, or data deletions.

Figure 2A:
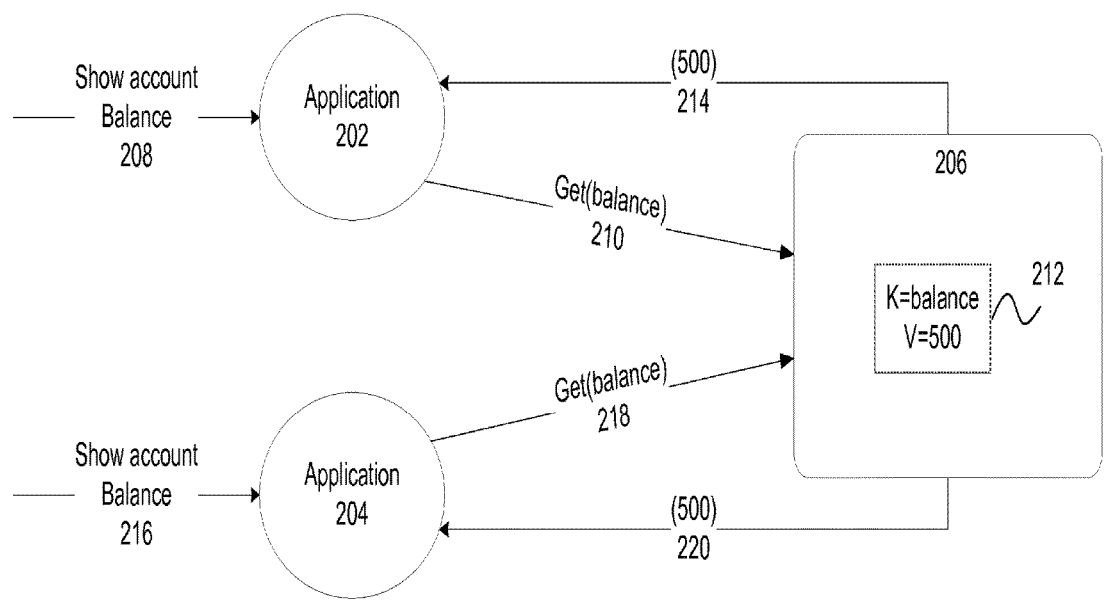
FIG. 2A illustrates applications receiving a request to retrieve data from a data grid according to one embodiment.

FIG. 2A illustrates applications 202 and 204 receiving a request (such as a request from an ATM or a bank, e.g., a get request) to retrieve an account balance for an individual (steps 208 and 216) from a node cluster 206. FIG. 2A further illustrates that applications 202 and 204 can send read commands 210 and 218 (e.g., get(balance)) to the node cluster 206 (arrows 210 and 218). The cache entries of nodes in the node cluster 206 can be iterated through and the account balance can be found at node 212 (e.g., an account balance of 500). In one example, the node 212 can communicate the account balance to the applications 202 and 204 (arrows 214 and 220).

Figure 2B:
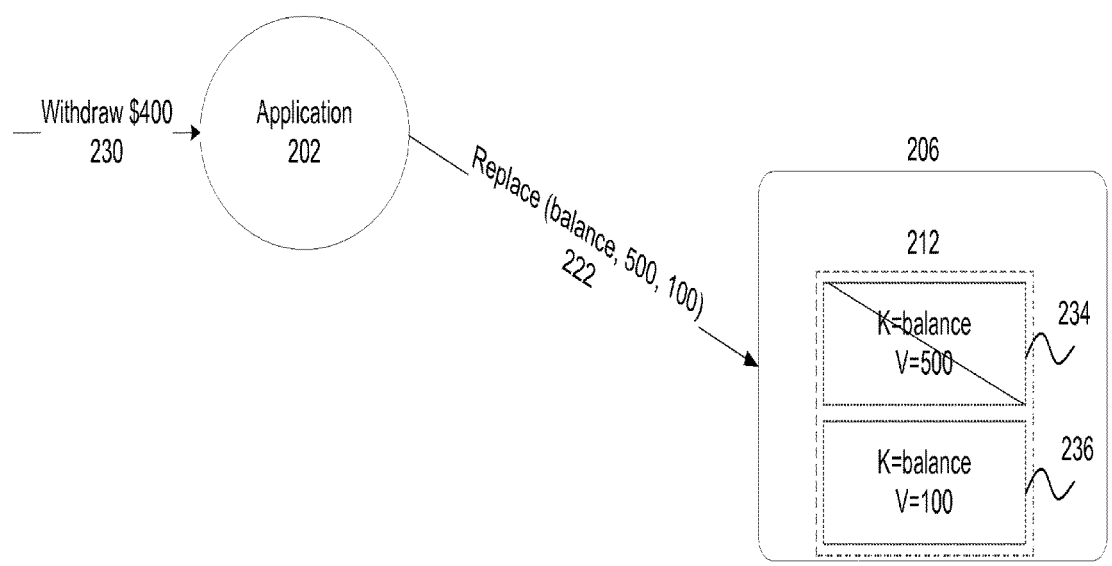
FIG. 2B illustrates an application receiving a request to modify data from a node cluster according to one embodiment.

FIG. 2B illustrates application 202 receiving a request (such as from an ATM or a bank) to withdraw an amount from an account balance for an individual (arrow 230) from a node cluster 206. FIG. 2B further illustrates that application 202 can send a replace command (e.g., get(balance)) to the node cluster 206 (arrow 232). The cache entries of nodes in node cluster 206 can be iterated through and the account balance of 500 can be found at node 212 (step 234). The account balance can be replaced with an account balance of 100 (step 236). In another example, data can be removed or deleted at a node in the cluster using a delete command, such as a delete(key) command (not shown in the figures).

To track or monitor the addition or removal of cache entries at the nodes in a cluster, modifications to the cache entries at the nodes, and so forth, listeners may be used. A listener is an application registered on a node that can be used to query for requested data. In one example, local listeners can be used in a distributed node configuration. The local listeners can be located locally at different nodes in the cluster. The local listeners can receive notifications (e.g., listen for notifications) of events or operations at the cache of a node where the local listener is registered. The events or operations can include data updates, data removal, data modification, and so forth. In one example, a local listener can be notified twice of an event or operation at the cache of the node, once before the operation is completed and once after the operation is completed. In another example, for a node with a transactional cache, the local listener can be notified when a transaction begins and notified when the transaction is completed (such as via a rollback or a commit command).

To determine what data is stored at the nodes in a cluster, the data at the caches of the nodes can be iterated through. For example, data entries of a cache can be iterated through using a consistent hash function, e.g., CH(key)->nodes. In one example, multiple caches of nodes in a cluster can be iterated through sequentially, e.g., a cache of one node can be iterated through before the cache of another node is iterated through. In another example, the caches of the multiple nodes in a cluster can be iterated through at the same time, e.g., simultaneous iteration of multiple caches. An advantage of simultaneous querying multiple nodes can be to decrease an overall query time of a cluster.

In one example, the local listeners can be local to the node where an event occurs. A data grid can include data which is stored at the caches of nodes A, B, C, D, and E (numOwners=2). The data grid can use a key (K) to select local listeners to receive activity or event notification for activities or events at selected nodes, e.g., owners(K)={A,B}. In this example, local listeners at nodes A and B can receive activity or event notifications for activities or events (such as an entry, removal, or update of data) at caches of nodes A and B related to the key K. Additionally, the local listener at node C may not receive any notifications for activities or events related to the key K.

Alternatively, a clustered listener can be used in a data grid, such as in a distributed node configuration. In one example, a clustered listener can represent a single listener installed at a listener node to receive event notifications that occur at caches of nodes in the cluster. The event notifications can include: a notification for a data entry event or a data creation event at a cache of a node in the cluster (a CacheEntryCreatedEvent notification), a notification for modification to data at the cache of the node in the cluster (a CacheEntryModifiedEvent notification), and a notification for removal of data at the cache of the node in the cluster (a CacheEntryRemovedEvent notification). Whereas local listeners in a distributed cache may only be notified of events for the cache at the node where the data resides, a clustered listener is a single listener that receives notifications (such as CacheEntryCreatedEvent notifications, CacheEntryModifiedEvent notifications, and CacheEntryRemovedEvent notifications) that occur in the different caches of the nodes in the cluster where the cluster listener is installed at the listener node.

An advantage of a cluster listener receiving event notifications that occur at caches of nodes in the cluster can be that when an iteration process, such as for a query search, is performed at a node and new data is written to the node during the iteration process, an order of the initial data and the new data can be maintained. For example, when a cluster listener is installed to monitor and query data in the cluster for credit card fraud detection, transactions for different customers can occur on a frequent basis. In this example, when a query search for possible fraudulent charges to a credit card is initiated, data can be iterated through for different caches of nodes in the cluster. While the iteration process is occurring, a new transaction may take place that relates to the query search. The cluster listener can receive an event notification when an event (such as a transaction) has occurred at the cache of a node in the cluster and maintain an order of the transaction as they occur. In one example, a cluster listener can receive notifications when an operation begins and when the operation ends. In another example, a cluster listener can receive notification after the operation is completed. In another example, the cluster listener can be notified after data has been updated or modified, i.e. notifications of committed entries. In this example, the cluster listener may not receive notifications for transaction registering events (TransactionRegisteredEvent) or for transaction completed events (TransactionCompletedEvent). An advantage of the cluster listener receiving notification when the operation is completed can be to avoid a false positive of a completion of the event before the entire operation has completed.

In one example, the cluster listener can be installed at a listener node. A data grid can include numOwners=2 that run on nodes A, B, C, D, and E and a key K in the data grid, with owners(K)={A,B}. In this example, the cluster listener can be notified of events, irrespective of where the events occurred (e.g., irrespective of which node the event occurred at). For example, a cluster listener registered on node C can receive notifications of events originated by a key to add, remove, or modify data at nodes A, B, D, and/or E.

Figure 3A:
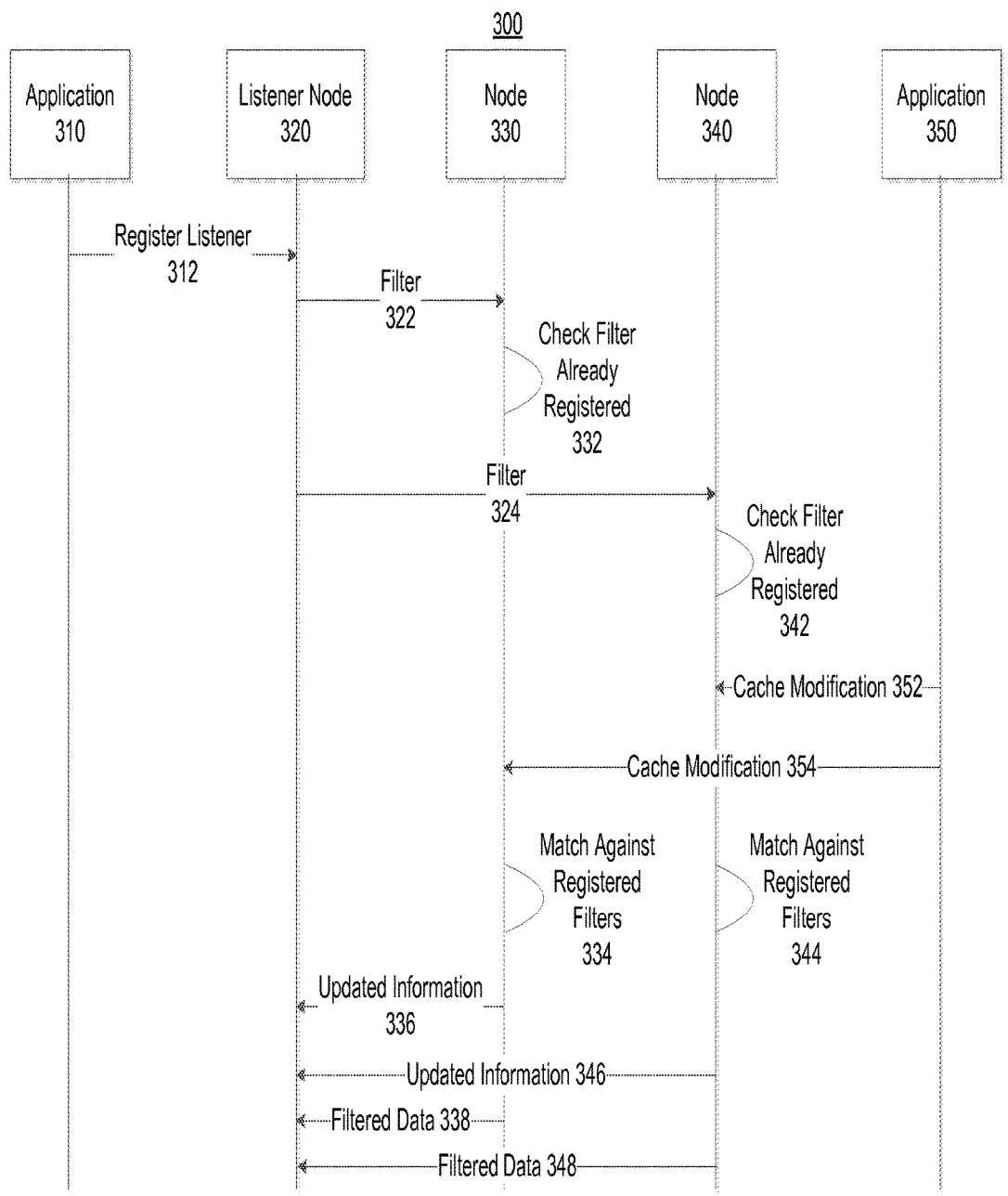
FIG. 3A depicts a sequence diagram of a method of monitoring data addition, removal, or modification in a data grid according to one embodiment.

FIG. 3A depicts a sequence diagram of a method 300 of monitoring data addition, removal, and/or modification in a data grid. Method 300 may be performed by processing logic that may comprise hardware (e.g., circuitry, dedicated logic, programmable logic, microcode, etc.), software (such as operations being performed by the MCU), firmware or a combination thereof. In one example, method 300 is performed by processor, a plurality of processors, a processor core, and/or a plurality of processor cores. Alternatively, other components of a computing system or software executing on the processor may perform some or all of the operations of the method 300.

Referring to FIG. 3A, the method 300 can begin by an application 310 registering or installing an iterator, e.g., a cluster listener, at a listener node 320 (step 312). In one example, the application 310 can be a web application that sends a cluster listener to the listener node 320. In another example, the application 310 can be a remote client that sends a query request. In another example, the application 310 can be aware of the topology of the cluster and select a node to install the cluster listener at. For example, the application 310 may be aware that a node in the cluster has fewer cluster listeners installed on the node than other nodes in the cluster and select the node to send the cluster listener to for installation. In another example, the application 310 may randomly select a node to send the cluster listener to.

In one example, the cluster listener can be a functional handler that accepts the results of an iteration process of nodes in a data grid. In another example, the cluster listener can include a filter, such as a data filter. The cluster listener can be notified on events in the cluster that pass or satisfy criteria of the filter.

The listener node 320 may not know what data is stored at different nodes in the data cluster. The listener node 320 can communicate the filter to node 330 in a cluster of the data grid (arrow 322). In one example, the node 330 can use the filter when iterating over cache entries to determine which cache entries match query criteria of the filter. In another example, the cluster in the data grid can include multiple listener nodes that communicate filters to other nodes in the cluster. The node 330 can check if the filter received from the listener node 320 has already been registered for use by another cluster listener in the cluster (step 332). In one example, the multiple listener nodes may not be aware of the other filters installed on the other nodes. For example, listener node 320 may not be aware of other filters installed by other listener nodes at node 330 but node 330 can be aware of the different filters registered at node 330. When the filter has previously been received from the other cluster listener, the node 430 may not install duplicative filters at the node, but rather use the one filter and communicate data matching the filter to both of the cluster listeners.

The listener node 320 can also communicate the filter to a node 340 in the cluster of the data grid (step 324). The node 340 can check if the filter is already registered for use by other cluster listeners in the cluster (step 342). In one example, nodes 330 and/or 340 can use the filter to map a set of nodes interested in events matching the filter, such as the filter={Listener Node 310, Node X}. In another example, nodes 330 and/or 340 can use filter parameters to determine which events should be communicated to the cluster listener.

In one example, a filter and a projector can be associated with the cluster listener to reduce network chattiness and increase a performance of the data grid. A projector can represent an application to extract information from a subset of data. In one example, the filter can select a subset of data (e.g., relevant data) for the cluster listener. For example, a data set can include the names and ages of multiple people and the filter can select people with an age above 18 years old. In another example, the projector can extract information from the data subset (e.g., relevant bits) of the filtered data and pass the information to the cluster listener. For example, a query may be for names of people and the projector can send only the names people selected by the filter, e.g., the projector can remove the age info from the filtered data that is send to the listener. One advantage of using the filter and the projector can be to reduce network traffic by enabling nodes to communicate relevant data to the cluster listener at the node 320.

An application 350 can communicate a memory modification to the node 340 and/or node 330 in the data grid (steps 352 and 354). In one example, the memory modification can be: a cache write, such as a Put (k, v) command; a cache entry removal or deletion, such as a Delete (k, v) command; or a memory modification. In one example, the node 330 and/or the node 340 can receive multiple memory modifications at the same time. In another example, the application 350 can be aware of the topology of the cluster and select a node in the cluster to write a cache entry to. In another example, the node selection may be a specific node selection when the application is aware of where the cache entry should be written. In another example, the application may choose a node at random to write data to, and the randomly selected node can direct the data write to a node where the cache entry should be written (e.g., the node that owns the cache entry). The node that owns the cache entry can be determined by applying a consistent hash function on a key of the cache entry.

The node 330 and node 340 can monitor for memory modification or memory entry events (e.g., when data is written or modified at the cache of the node 330 or 340) and determine when a memory entry event occurs that matches a filter registered at node 330 and/or node 340 (steps 334 and 344). In one example, node 330 or node 340 can communicate the data from the memory entry event to the listener node 320 when the memory entry event occurs (steps 336 and 346). In one example, the node 330 or node 340 can also communicate the filtered data to the listener at the listener node 320 during the iteration process (steps 338 and 348). In another example, the node 330 or node 340 can also communicate the filtered data to the listener at the listener node 320 after the iteration process. In another example, the listener of the listener node 320 may cache the results of a query.

Figure 3B:
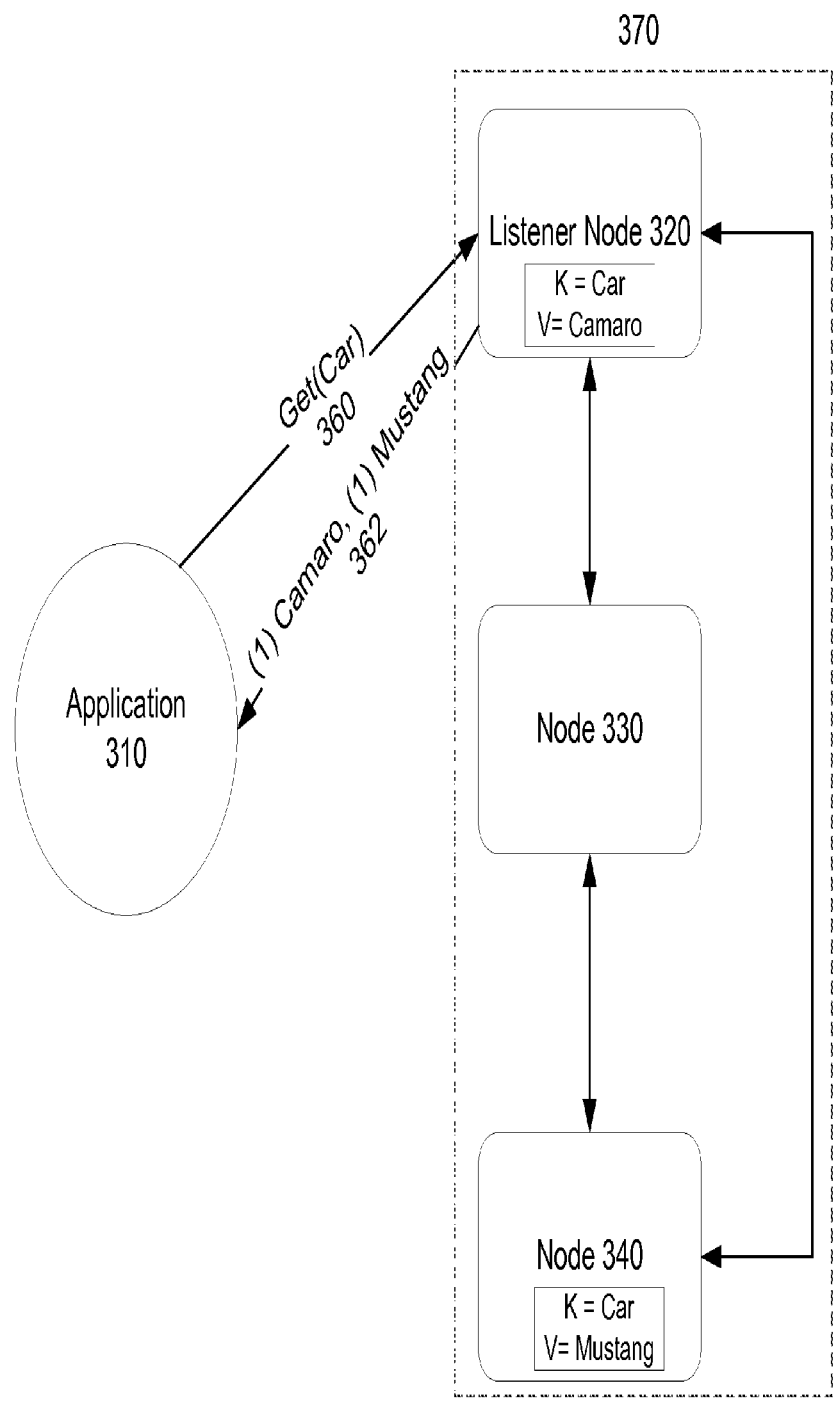
FIG. 3B illustrates an application performing a query in cluster of a data grid according to one embodiment.

FIG. 3B illustrates an application 310 performing a query in cluster 370 of a data grid. Application 310 can send a listener (arrow 360) to a listener node 320 in the cluster 370. In one example, the listener can be for a query or search request and include query or search criteria, such as a request to query for car data in the cluster 370. The listener node 320 can receive the listener and register the listener at the listener node 320. In one example, nodes 320, 330, and 340 can be interconnected and communicate requests and information between the nodes 320, 330, and 340. As discussed in the preceding paragraphs, an iteration process can be performed at the nodes 320, 330, and 340 of the cluster 370 to find the car data. When the nodes 320, 330, and 340 are queried, nodes 320 and 340 can include cache entries with car data, e.g. data for a Mustang and for a Camaro. The listener at the listener node 320 can receive the car data and communicate the car data to the application 310 (arrow 362).

Figure 3C:
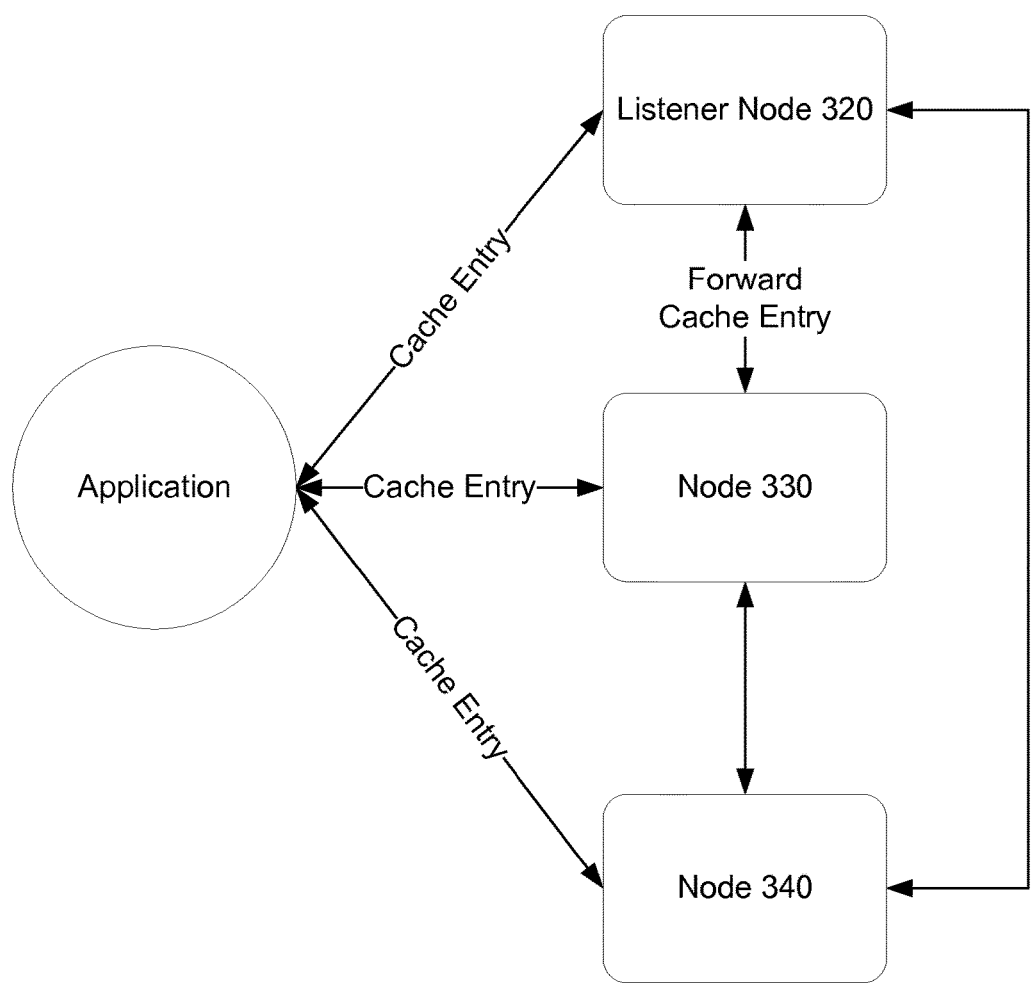
FIG. 3C illustrates an application modifying a cache of nodes according to one embodiment.

FIG. 3C illustrates an application 350 modifying caches of nodes 320, 330, and/or 340 in a cluster. In one example, the application can send data to a listener node 320 in the cluster (e.g. a cache entry such as an update to the cache) and the listener node 320 can forward the data to node 330 in the cluster. In another example, the application 350 can send data to node 330 or 340 in the cluster and the node 330 or 340 can forward the information to node 320, 330, or 340, respectively. An advantage of the application 350 being able to send the data to a node 320, 330, or 340 in the cluster and the node 320, 330, or 340 forwarding the data to another node 320, 330, or 340, respectively, can be to enable an application to send data to a cluster without knowing an actual cluster topology or an actual cache entry location that the data may be entered in a cache of a node in the cluster. In another example, the application 350 can send data to nodes 320, 330, and/or 340 directly. An advantage of sending the data to the nodes 320, 330, and/or 340 directly can be to reduce bandwidth usage and increase data communication efficiency.

Figure 4:
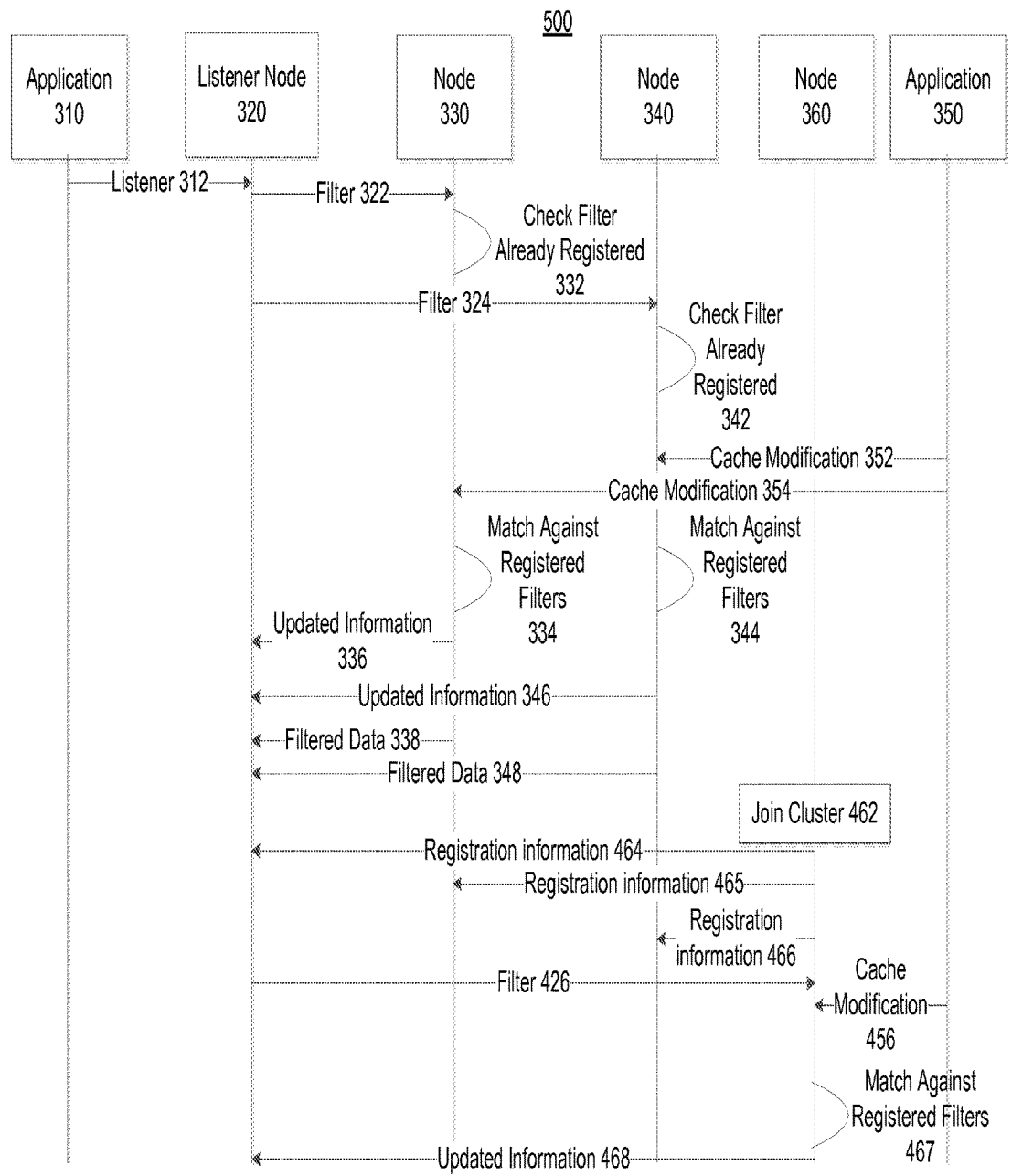
FIG. 4 depicts a sequence diagram of a method of a new node joining a node cluster in a data grid according to one embodiment.

FIG. 4 depicts a sequence diagram of a method 400 of a new node 360 joining a node cluster in a data grid. Method 400 may be performed by processing logic that may comprise hardware (e.g., circuitry, dedicated logic, programmable logic, microcode, etc.), software (such as operations being performed by the MCU), firmware or a combination thereof. In one example, method 400 is performed by a processor, a plurality of processors, a processor core, and/or a plurality of processor cores. Alternatively, other components of a computing system or software executing on the processor may perform some or all of the operations of the method 400.

Referring to FIG. 4, the method 400 is the same as the method discussed in the preceding paragraphs for FIG. 3 through the steps of nodes 330 and 340 communicating the filtered data to the listener at the listener node 320 during the iteration process (steps 346 and 348). FIG. 4 further depicts the new node 360 joining the node cluster of the data grid (block 462). In one example, the new node 360 can join the node cluster by sending a join cluster request to a cluster manager requesting to join the node cluster. A cluster manager can be a module or software at one or more of the nodes 320, 330, 340, and/or 360 to manage and/or configure services or activities of a node cluster (such as a new node join the node cluster). In this example, the cluster manger can send an acceptance message in response to the join cluster request, indicating that the new node can join the node cluster. In another example, the cluster manager can send a request to the new node 360 requesting that the new node 360 join the node cluster. In this example, the new node 360 can send an acceptance message in response to the join cluster request and join the node cluster. When node 360 joins the node cluster, the node 360 can communicate cluster registration information to nodes 320-340 in the node cluster (steps 464, 465, and 466).

In one example, the cluster registration information can be group membership information such as topology information for updating consistent hashing functions at nodes 320-340 (e.g., update the topology information at the nodes in the cluster to indicate that a new node has joined the cluster). In one example, when the node 360 communicates cluster registration information to nodes 320-340, nodes 320-340 can update topology information at the nodes 320-340 to include the node 360. In another example, the nodes 320-340 or the listener can send cluster registration information to node 360 to enable node 360 to determine the topology of the node cluster.

When the listener node 320 receives the registration information from node 360, the listener of the listener node 320 can send a filter to node 360 (step 426). An application 350 can communicate a memory modification to the node 360 in the data grid (step 456). The node 360 can monitor for the memory modification or memory entry events (e.g. when data is written or modified at the cache of the node 360) and determine when a memory entry event occurs that matches the filter at node 360 (step 467). When a memory modification or a memory entry event occurs at node 360, the node 360 can communicate the data of the memory entry event that matches the filter to the listener node 320 when the memory entry event occurs (step 468).

Figure 5:
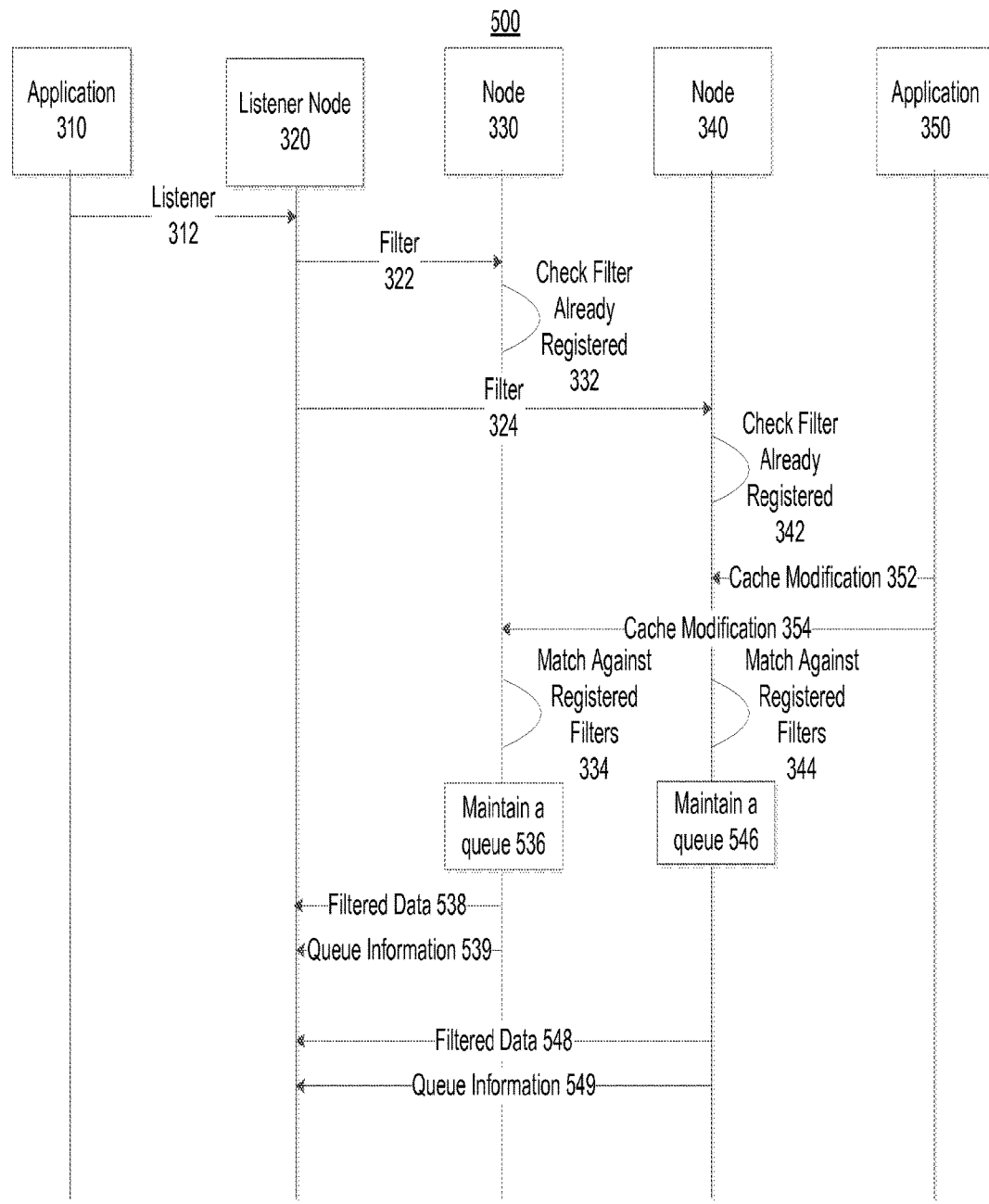
FIG. 5 depicts a sequence diagram of a method of monitoring data addition, removal, and/or modification in a data grid according to one embodiment.

FIG. 5 depicts a sequence diagram of a method 500 of monitoring data addition, removal, and/or modification in a data grid. Method 500 may be performed by processing logic that may comprise hardware (e.g., circuitry, dedicated logic, programmable logic, microcode, etc.), software (such as operations being performed by the MCU), firmware or a combination thereof. In one example, method 500 is performed by processor, a plurality of processors, a processor core, and/or a plurality of processor cores. Alternatively, other components of a computing system or software executing on the processor may perform some or all of the operations of the method 500.

Referring to FIG. 5, the method 500 is the same as the method discussed in the preceding paragraphs for FIG. 3 through the steps of nodes 330 and 340 monitoring for memory entry events to determine when a memory entry event occurs that matches a filter registered at node 330 and/or node 340 (steps 334 and 344). When node 330 or node 340 determines that a memory entry event has occurred that matches the filter, node 330 and node 340 can maintain queues of the memory entry events that have occurred that match the filters registered at node 330 or node 340, respectively (steps 536 and 546). The node 330 or the node 340 can then communicate the filtered data to the listener at the listener node 320 (steps 538 and 548). When the nodes 330 and 340 in the data grid have completed an iteration process, the nodes 330 and 340 can communicate the memory entry events that are queued at the nodes 330 and 340, respectively, to the listener at listener node 320 (steps 539 and 549).

In one example, node 330 can finish iterating through the cache entries at the node 330 and communicate the filtered data and the queued data at a first time. In another example, node 340 can finish iterating through the cache entries at the node 340 and communicate the filtered data and queued data at a second time. In another example, nodes 330 and 340 can communicate the filtered data and the queued data at the same time. In another example, the filtered data can be sent in a first message and the queued data can be sent in a second message. In another example, the filtered data and the queued data can be sent in the same message.

In one example, after the iteration process has completed and the filtered data and queued data have been sent to the listener at the listener node 320. The filter may remain at the nodes 330 and 340, e.g., the filter is not uninstalled. When new cache entries are added, modified, or removed from the cache of node 330 or 340, the filter at node 330 or 340 can determine when the newly written cache entries match the filter. When the new cache entries match the filter at node 330 or 340, the filter can notify the listener at listener node 320 directly of the matching cache entries, e.g., without having to maintain a queue. In this example, the queue may be maintained while the initial iteration process takes place and after the iteration process is finished, the filter can send the cache entry information write to the listener directly.

Traditionally, when cache entries occur at a node during an iteration process, the cache entries were overlooked or sent to a querying application out of order. An advantage of maintaining a queue of changes to a cache of a node during the iteration process can be to track changes that occur at a location in the cache where the entries have already been iterated over during the iteration process. In one example, a credit card company can monitor for fraud detection. In this example, cache entries at a node in a cluster can be iterated through multiple times using the same or different filters. Additionally, customers of the credit card company can use their credit cards frequently, causing multiple transactions to be written into cache entries of a node on a regular or frequent basis. A listener may be installed by a first application for the credit card company to detect fraud, e.g., monitor the transactions of users to detect possibly fraudulent transactions. A second application for stores where customers purchase items can write data to a cache of a node. As the node iterates through the cache entry in view of a query search from the first application to monitor for fraudulent credit card charges, the node can maintain a queue of the cache entries (credit card transactions) from the second application to enable the credit card company to determine when cache entries were added, modified, or removed.

Figure 6A:
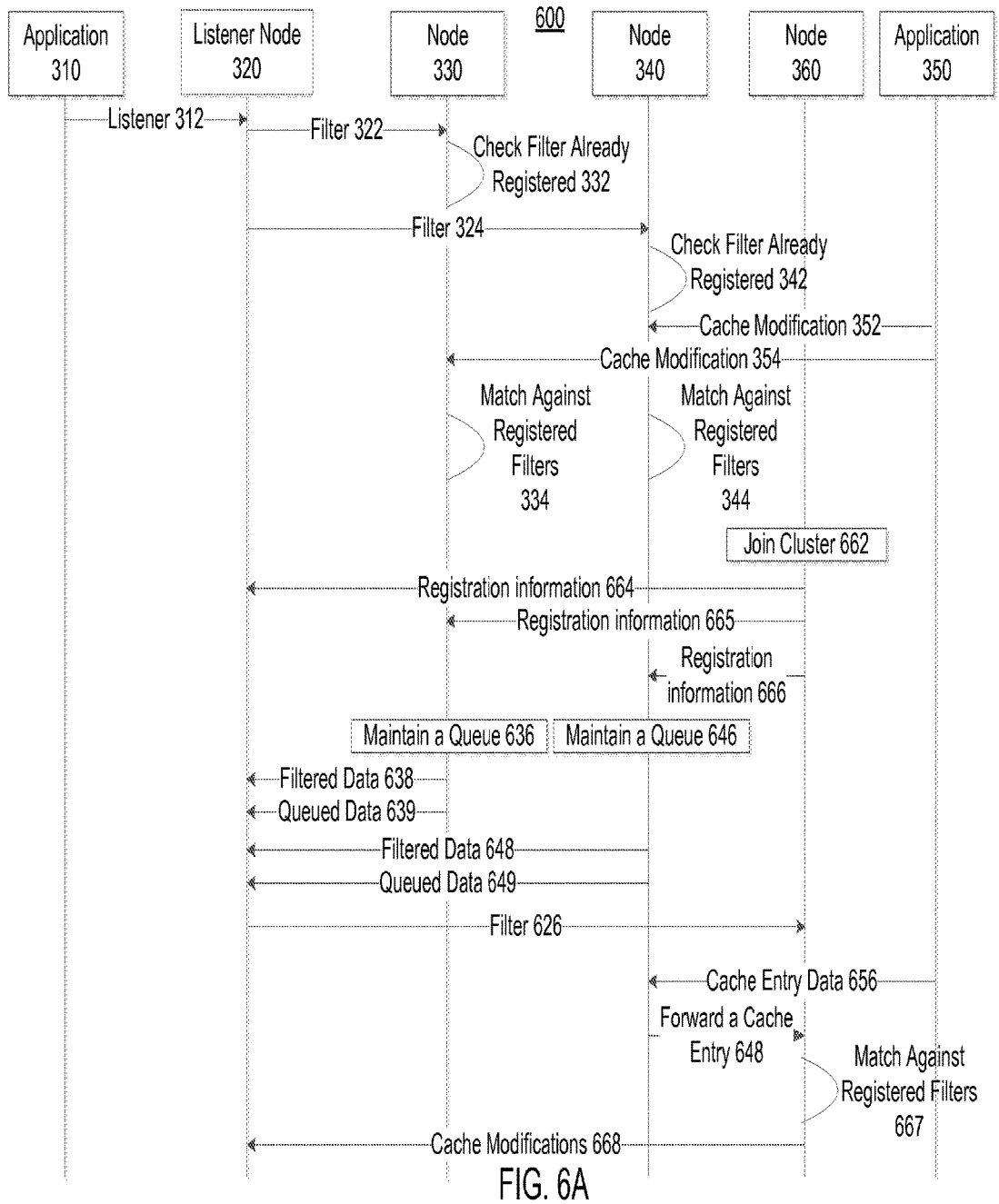
FIG. 6A depicts a sequence diagram of a method of a new node joining a node cluster while the current nodes maintain a queue of memory modifications during an iteration process of a query search according to one embodiment.

FIG. 6A is a sequence diagram of a method 600 of a new node 360 joining a node cluster while the current nodes 330 and 340 maintain a queue of memory modifications during an iteration process of a query search. Method 600 may be performed by processing logic that may comprise hardware (e.g., circuitry, dedicated logic, programmable logic, microcode, etc.), software (such as operations being performed by the MCU), firmware or a combination thereof. In one example, method 600 is performed by processor, a plurality of processors, a processor core, and/or a plurality of processor cores. Alternatively, other components of a computing system or software executing on the processor may perform some or all of the operations of the method 600.

Referring to FIG. 6A, the method 600 is substantially similar to the method discussed in the preceding paragraphs for FIG. 3 through the step of nodes 330 and 340 monitoring for memory entry events to determine when a memory entry event occurs that matches a filter registered at node 330 and/or node 340 (steps 334 and 344). FIG. 6A further depicts that the new node 360 joining the node cluster of the data grid (block 662). When node 360 joins the node cluster, the node 360 can communicate cluster registration information to nodes 320-340 in the node cluster (steps 664, 665, and 666). When the new node 360 joins the cluster, the other nodes 330 and 340 of the cluster can continue to determine when a memory entry event has occurred that matches the filter. Node 330 and node 340 can continue to maintain a queue of memory modifications (entries of data, changes to the data, removal of the data) to the caches of the node 330 and 340 (steps 636 and 646), as discussed in the preceding paragraphs. The node 330 or the node 340 can then communicate the filtered data to the listener at the listener node 320 (steps 638 and 648). When the nodes 330 and 340 in the data grid have completed an iteration process, the nodes 330 and 340 can communicate the memory modifications that are queued at the nodes 330 and 340, respectively (steps 639 and 649).

FIG. 6A further illustrates that when the listener node 320 receives the registration information from node 360, the listener of the listener node 320 can send a filter to node 360 (step 626). During the query search, an application 350 can communicate a memory modification or memory entry data to the node 340 in the data grid (step 656). The node 340 can forward the memory modification data or memory entry data to node 360. In one example, the node 340 may forward the memory modification data or memory entry data to node 360 when a memory capacity of the node 340 exceeds a memory capacity threshold (e.g., a full memory). In another example, the node 340 can forward the memory modification data or memory entry data to node 360 to enable different data types to be stored at different nodes. An advantage of storing different data types at different nodes can be increase an efficiency of the node cluster by accessing nodes that contain selected data types while enabling the other nodes of the node cluster to be free for access by other applications. The node 360 can monitor for memory modifications or memory entry events (e.g. when data is written or modified at the cache of the node 360) and determine when a memory entry event occurs that matches the filter at node 360 (step 667). When the memory modification or the memory entry event occurs at node 360, the node 360 can communicate the data of the memory entry event that matches the filter to the listener node 320 when the memory entry event occurs (step 668). When the listener node receives the filtered data, queued data, and/or the memory entry data, the listener can aggregate the data to provide query search results to application 310. In one example when the listener node 320 aggregates the data, the listener node can maintain an order of the data and avoid missing data entries.

Figure 6B:
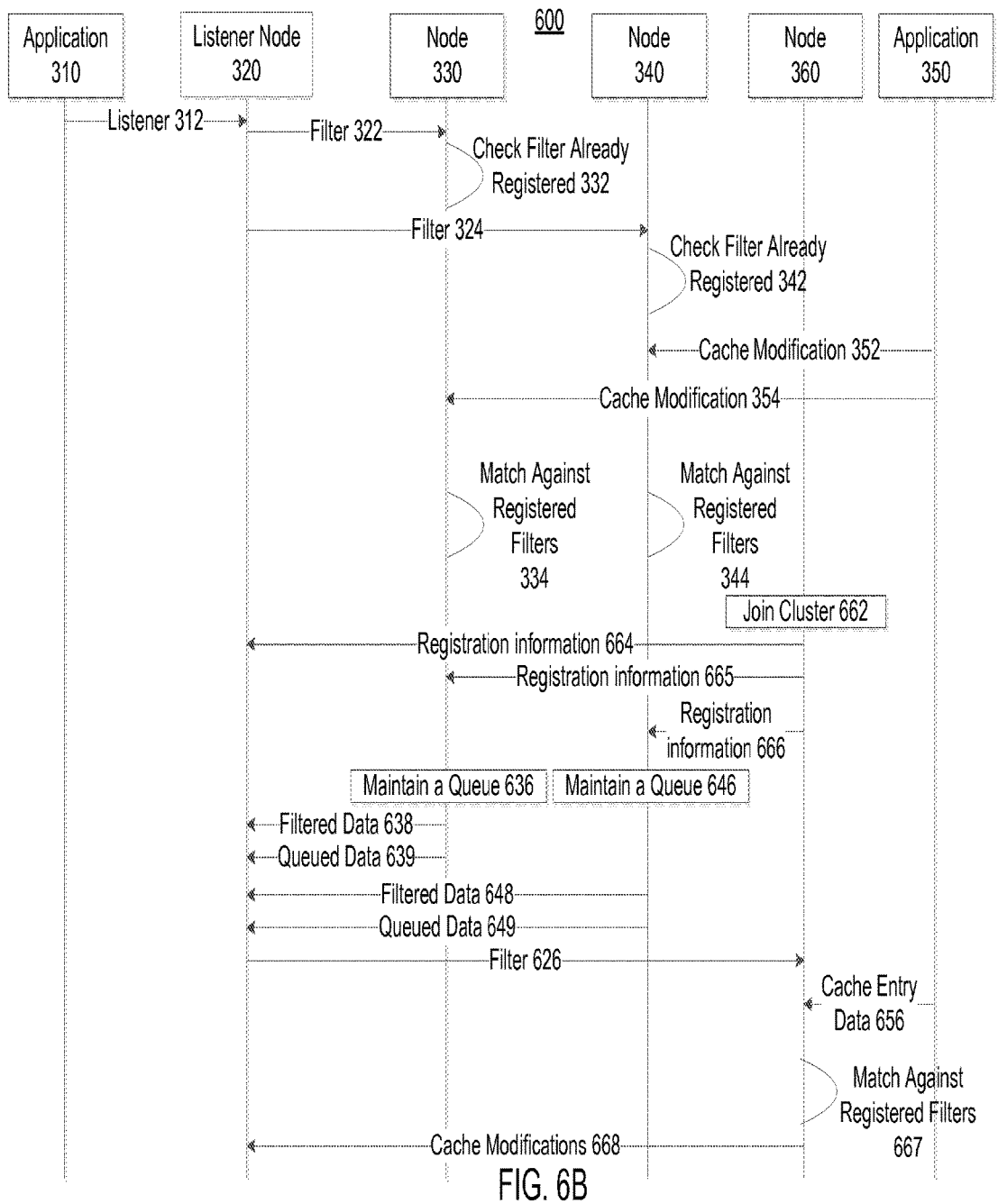
FIG. 6B depicts a sequence diagram of a method of a new node joining a node cluster while the current nodes maintain a queue of memory modifications during an iteration process of a query search according to one embodiment.

FIG. 6B is a sequence diagram of a method 600 of a new node 360 joining a node cluster while the current nodes 330 and 340 maintain a queue of memory modifications during an iteration process of a query search. Method 600 may be performed by processing logic that may comprise hardware (e.g., circuitry, dedicated logic, programmable logic, microcode, etc.), software (such as operations being performed by the MCU), firmware or a combination thereof. In one example, method 600 is performed by processor, a plurality of processors, a processor core, and/or a plurality of processor cores. Alternatively, other components of a computing system or software executing on the processor may perform some or all of the operations of the method 600.

Referring to FIG. 6B, the method 600 is substantially similar to the method discussed in the preceding paragraphs for FIG. 3 through the step of nodes 330 and 340 monitoring for memory entry events to determine when a memory entry event occurs that matches a filter registered at node 330 and/or node 340 (steps 334 and 344). FIG. 6B further depicts the new node 360 joining the node cluster of the data grid (block 662). When node 360 joins the node cluster, the node 360 can communicate cluster registration information to nodes 320-340 in the node cluster (steps 664, 665, and 666). When the new node 360 joins the cluster, the other nodes 330 and 340 of the cluster can continue to determine when a memory entry event has occurred that matches the filter. Node 330 and node 340 can continue to maintain a queue of memory modifications (entries of data, changes to the data, removal of the data) to the caches of the node 330 and 340 (steps 636 and 646), as discussed in the preceding paragraphs. The node 330 or the node 340 can then communicate the filtered data to the listener at the listener node 320 (steps 638 and 648). When the nodes 330 and 340 in the data grid have completed an iteration process, the nodes 330 and 340 can communicate the memory modifications that are queued at the nodes 330 and 340, respectively (steps 639 and 649).

FIG. 6B further illustrates that when the listener node 320 receives the registration information from node 360, the listener of the listener node 320 can send a filter to node 360 (step 626). During the query search, an application 350 can communicate a memory modification to the node 360 in the data grid (step 656). In one example, the application can communicate the memory modification to the node 360 when a memory capacity level of nodes 330 and/or 340 exceeds a threshold memory capacity level (e.g., a full memory). In another example, the application can communicate the memory modification to the node 360 when a type of the data is different than the data stored at nodes 330 and/or 340. The node 360 can monitor for memory modifications or memory entry events (e.g. when data is written or modified at the cache of the node 360) and determine when a memory entry event occurs that matches the filter at node 360 (step 667). When the memory modification or the memory entry event occurs at node 360, the node 360 can communicate the data of the memory entry event that matches the filter to the listener node 320 when the memory entry event occurs (step 668). In this example, node 360 can send received information to the listener without maintaining a queue because the node 360 may not have any information in the cache of the node 360 to be modified during the iteration process, while nodes 330 and 340 can continue to maintain a queue as discussed in the preceding paragraphs. In another example, when data has been written to the cache of node 360 during the iteration process and then the data is modified, the node 360 can maintain a queue of the memory modifications and send the queued memory modifications to the listener at listener node 320, as discussed from nodes 330 and 340 in the preceding paragraphs.

In one example, nodes 320-340 in the node cluster can include a state transfer function to manage data in the node cluster and transfer data between nodes 320-340 and/or transfer data to the new node 360 after the new node 360 joins the node cluster. For example, the state transfer function of a node can use a consistent hashing function to determine which node to transfer data to or which node to move data from. In one example, when the new node 360 joins the cluster in a data grid, the new node 360 can receive data stored in the nodes 320-340 in the cluster and/or new data written to the new node 360 as part of the cluster. For example, the cluster can include nodes 320, 330, and 340. Key 1 of a cache entry key and a value pair can be stored at nodes 330 and 340. Key 1 can be removed from node 340 and transferred to the new node 360 when the new node 360 joins the cluster.

In one example, a node in the cluster can use a consistent hash function to determine where data will be stored in an active node. In another example, the consistent hash function can minimize data transfers between nodes to reduce data traffic between the nodes in the cluster. In another example, the nodes 320, 330, 340, and/or 360 can communicate with other nodes in the cluster and use the consistent hashing function to determine where to direct data in the cluster. In another example, when the topology of the cluster changes (e.g., a node leaves or joins the cluster) the consistent hash function can be changed or updated in view of the new node cluster topology. When the consistent hashing function changes or is updated, data at the nodes 320, 330, 340, and/or 360 may be reshuffled according to the changed or updated consistent hash function. In one example, node 330 in the cluster can iterate over the data stored at the node 330 to determine if data should be transferred to the new node 360 joining the cluster and what data can be transferred to the new node 360.

In one example, the new node 360 can receive memory or cache entries (e.g., new data) and nodes 330 and/or 340 can continue to receive memory or cache modification data (e.g., changing data currently stored at nodes 330 and/or 340). For example, when the application 350 communicates new or different data to the node cluster that has not been previously stored in the node cluster (such as banking information of a new customer), the new data can be communicated to the node 360. In this example, when the application 350 communicates data to modify data currently stored in a memory of nodes 330 and/or 340 (such as banking information of a previous or current customer), the data can be modified at nodes 330 and/or 340. An advantage of storing new data at node 360 and storing modification data at nodes 330 and/or 340 can enable new data to be written to new node 360 during a search query while maintaining a continuity of the current data stored at nodes 330 and 340 (e.g., maintain an order of previous and currently stored data in the current nodes of a node cluster).

In one example, the new node 360 can receive transferred data from nodes 330 and/or 340 when the nodes 330 and/or 340 have completed the iteration process of the query search. An advantage of transferring the data from the nodes 330 and/or 340 after the iteration process of the query search has completed at the nodes 330 and/or 340, respectively, can be to ensure that the data sent to the listener at listener node 320 is in order and up to date. For example, the nodes 330 and/or 340 can store data in the caches of nodes 330 and/or 340 during the iteration process of the query search and maintain the queues at nodes 330 and 340 during the iteration process. After the iteration process is completed, the nodes 330 and/or 340 can transfer stored data to the new node to free up memory at nodes 330 and/or 340, while the order of the data was maintained during the iteration process. Additionally, to ensure that new data written into the node cluster during the iteration process does not exceed the memory capacity of the current nodes 330 and 340 in the node cluster, the new data can be written to the memory of the new node 360.

Figure 7:
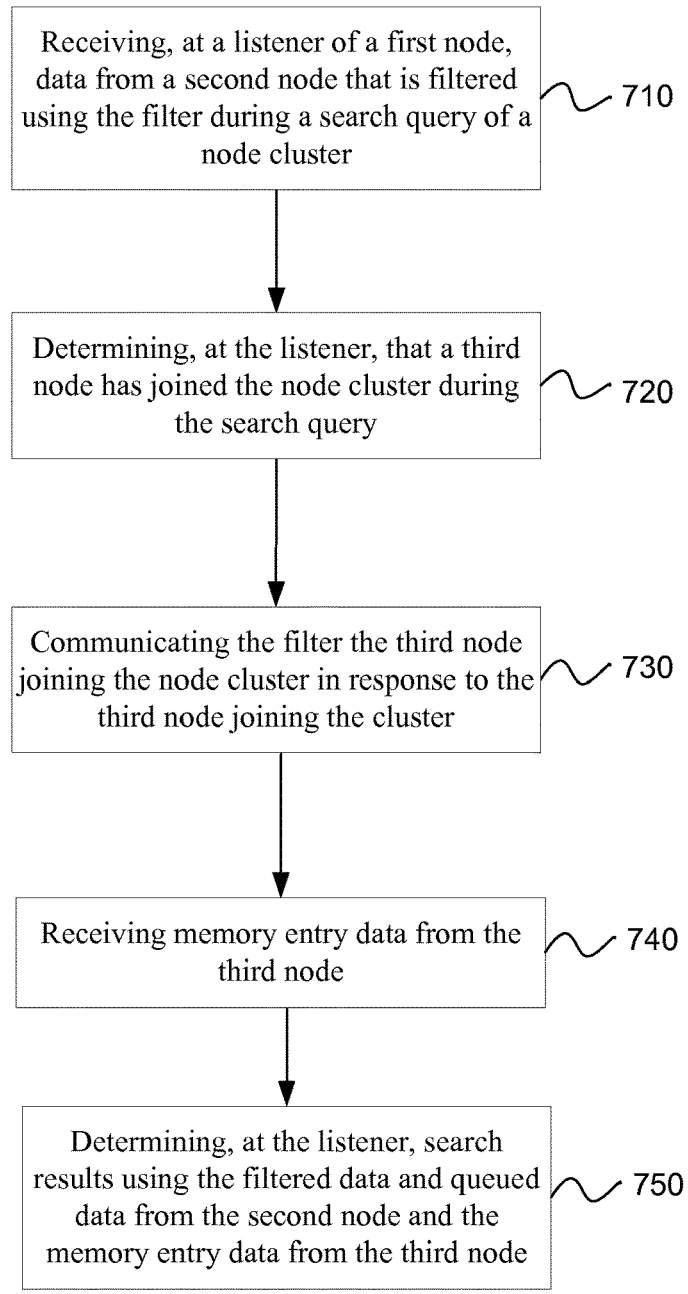
FIG. 7 depicts a flow diagram of a method of communicating information in a data grid system according to one embodiment.

FIG. 7 depicts a flow diagram of a method 700 of communicating information in a data grid system. Method 700 may be performed by processing logic that may comprise hardware (e.g., circuitry, dedicated logic, programmable logic, microcode, etc.), software (such as operations being performed by the MCU), firmware or a combination thereof. In one example, method 900 is performed by processor, a plurality of processors, a processor core, and/or a plurality of processor cores. Alternatively, other components of a computing system or software executing on the processor may perform some or all of the operations of the method 700.

Referring to FIG. 7, the method 700 begins by receiving, at a listener of a first node, data from a second node that is filtered using the filter during a search query of a node cluster, wherein the filter is defined by search criteria of a search query (block 710). The method can further include determining, at the listener, that a third node has joined the node cluster during the search query (block 720). The method can further include communicating the filter to the third node joining the node cluster in response to the third node joining the cluster (block 730). The method can further include receiving memory entry data from the third node (block 740). In one example, the memory entry data can include data forwarded from the second node. In another example, the memory entry data can be filtered using the filter. The method can further include determining, at the listener, search results using the filtered data and queued data from the second node and the memory entry data from the third node (block 750).

In one example, the method can further include: receiving, at the listener, data from a fourth node that is filtered using the filter; and receiving queued update information from the fourth node, wherein the queued update information comprises information of changes to filtered data maintained in a queue at a second node during the search query. In another example, the receiving, communicating, and determining can occur during an iteration period of the search query. In another example, the second node can forward the memory entry data to the third node when a memory level of the second node exceeds a threshold capacity level. In another example, the method can also include: maintaining a list of the filtered data, the queued update information, and the memory entry data; and determining search results using the list.

Figure 8:
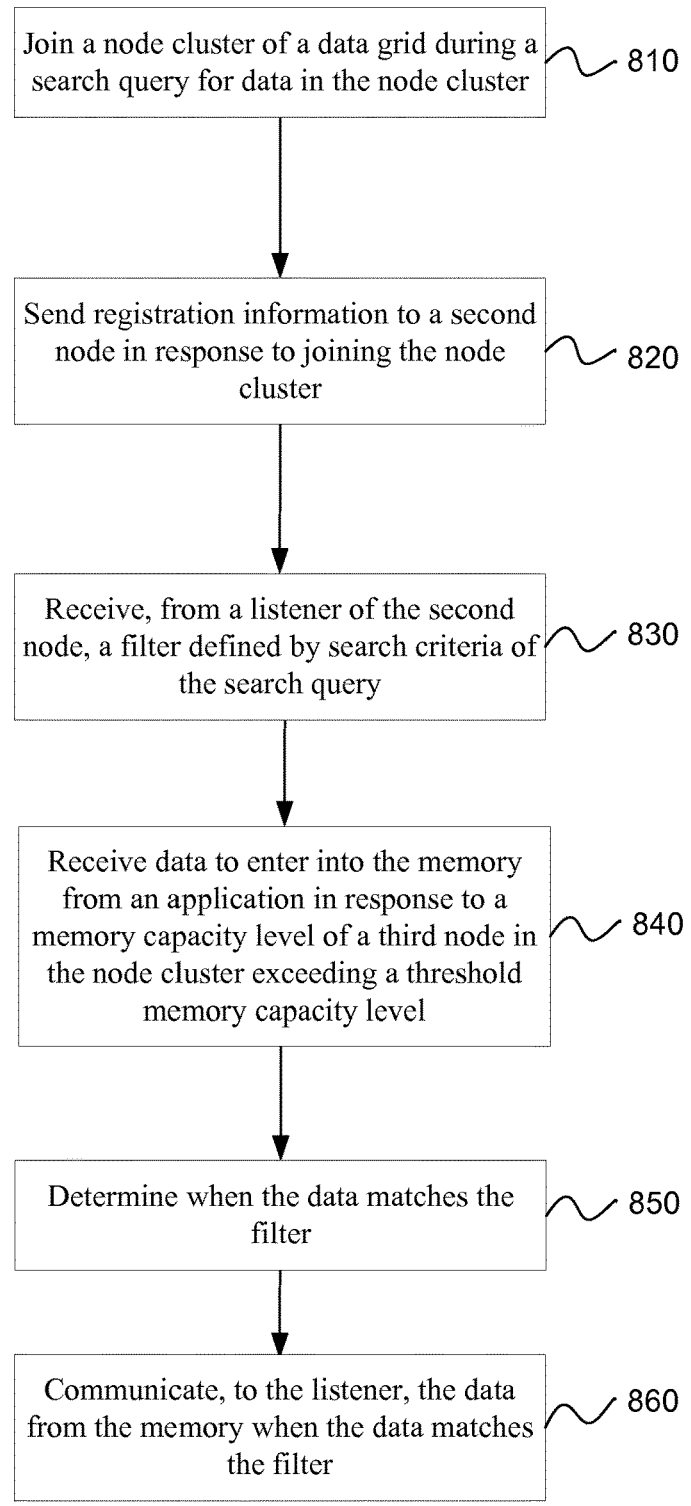
FIG. 8 depicts a flow diagram of a functionality of a node including a memory to receive data according to one embodiment.

FIG. 8 is a flow diagram of a functionality 800 of a first node including a memory to store data of the first node and a processor coupled to the memory. The first node can join a node cluster of a data grid during a search query for data in the node cluster (block 810). The processor can send registration information to a second node in response to joining the node cluster (block 820). The processor can further receive, from a listener of the second node, a filter defined by search criteria of the search query (block 830). The processor can further receive data to enter into the memory from an application in response to a memory capacity level of a third node in the node cluster exceeding a threshold memory capacity level (block 840). The processor can further determine when the data matches the filter (block 850). The processor can further communicate, to the listener, the data from the memory when the data matches the filter (block 860)

In one example, the registration information can be topology information indicating that the first node has joined the node cluster during the search query. In another example, the registration information comprises topology update information to enable the second node to update topology information of the node cluster to include the first node. In another example, the joining, sending, receiving, and communicating can occur during an iteration period of the search query. In another example, the processor can join the node cluster by: sending a join cluster request to a cluster manager of the node cluster requesting to join the node cluster; and receive, from the cluster manager, an acceptance message in response to the join cluster request, wherein the acceptance message indicates that the first node is authorized by the node cluster. In another example, the processor can receive data forwarded from the second node or another node in the node cluster in response to a memory level of the second node or the other node exceeding a threshold capacity level. In another example, the processor can receive data stored at the second node or the other node after the search query has completed.

Figure 9:
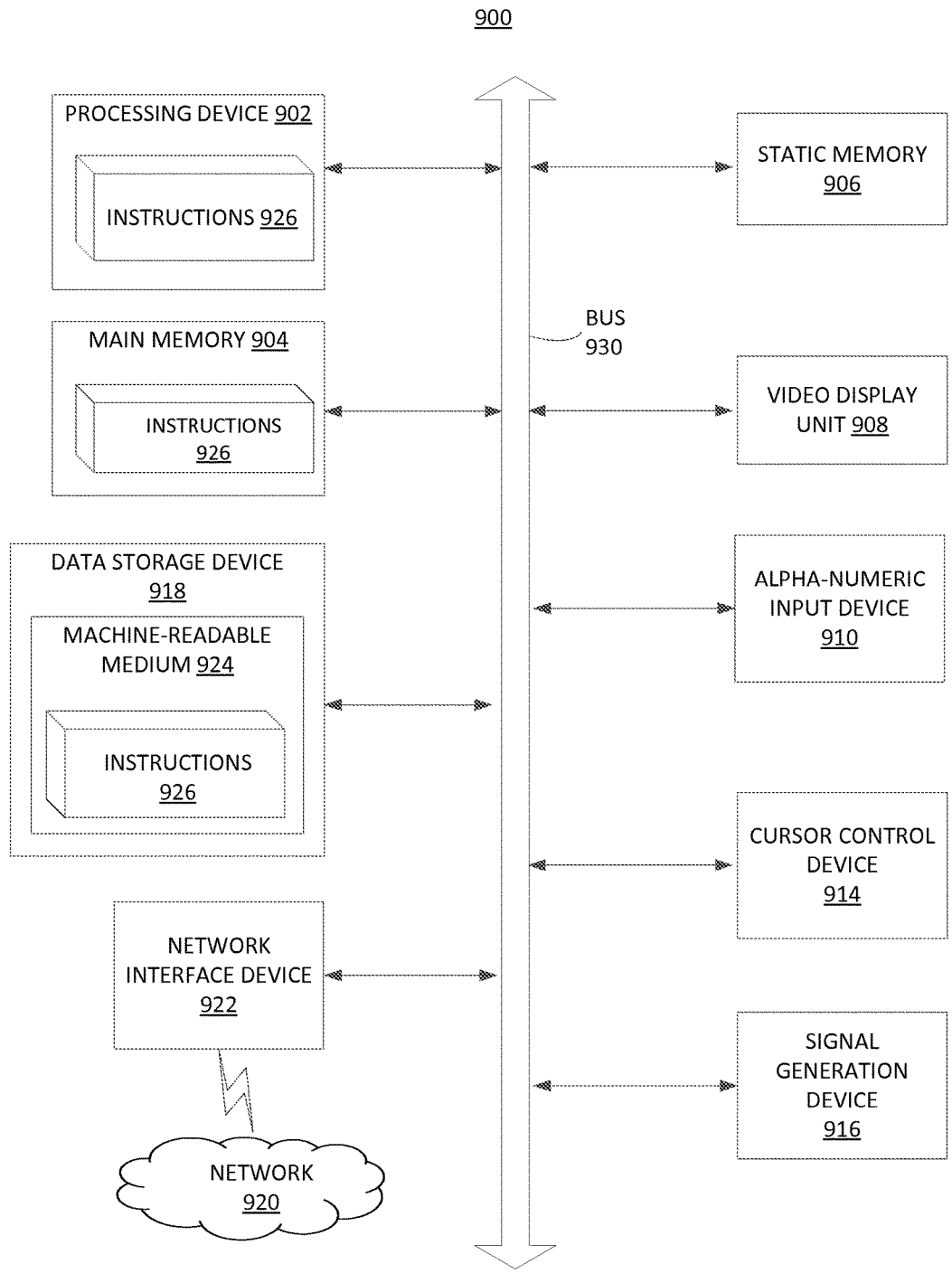
FIG. 9 illustrates a block diagram of one implementation of a computer system.

FIG. 9 illustrates a diagrammatic representation of a machine in the exemplary form of a computer system 900 within which a set of instructions for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computer system 900 may further include a network interface device 922. The computer system 900 also may include a video display unit 908 (e.g., a liquid crystal display (LCD), a cathode ray tube (CRT), or a touch screen), an alphanumeric input device 910 (e.g., a keyboard), a cursor control device 914 (e.g., a mouse), and a signal generation device 916 (e.g., a speaker).

The data storage device 918 may include a machine-readable storage medium 924 on which is stored one or more sets of instructions 926 (e.g., software) embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting computer-readable storage media. The instructions 926 may further be transmitted or received over a network 920 via the network interface device 934.

While the machine-readable storage medium 924 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A first node, comprising:
a memory to store data of the first node within a node cluster of a data grid;
a processing device, operatively coupled to the memory, the processing device to execute a listener to:
receive, from a second node, data that is filtered using a filter during a search query of the node cluster, wherein the filter is defined by search criteria of a search query;
receive queued update information from the second node, wherein the queued update information comprises information of changes to the filtered data maintained in a queue at the second node during the search query;
determine that a third node has joined the node cluster during the search query; and
communicate the filter to the third node in response to the third node joining the cluster.

2. The first node of claim 1, wherein the processing device further to:
receive memory entry data from the third node, wherein the memory entry data is filtered using the filter; and
determine search results using the filtered data and queued update information from the second node and the memory entry data from the third node,
wherein the listener is further to receive memory modification data from the third node, wherein:
the memory entry data comprises memory modification data forwarded from the second node, and
the memory entry data is filtered using the filter.

3. The first node of claim 2, wherein the second node forwards the memory entry data to the third node when a memory level of the second node exceeds a threshold capacity level.

4. The first node of claim 1, wherein the processing device is further to:
receive registration information from the third node in response to the third node joining the node cluster during the search query; and
determine that the third node has joined the node cluster in view of the registration information.

5. The first node of claim 4, wherein the registration information is topology information indicating that the third node has joined the node cluster.

6. The first node of claim 4, wherein the processing device is further to update topology information of the node cluster to include the third node using the registration information.

7. The first node of claim 4, wherein the processor is further to:
update topology information of a consistent hashing function using the registration information; and
transfer data, from the memory of the first node, to the second node or another node in the node cluster using the consistent hashing function.

8. The first node of claim 1, wherein the processing device is further to:
maintain a list of the filtered data, the queued update information, and the memory entry data; and
determine search results using the list.

9. The first node of claim 1, wherein the processing device is further to communicate, to the second node, the filter defined by search criteria of a search query.

10. The first node of claim 1, wherein the processing device is to:
receive, from another application, the listener; and
register the listener at the first node.

11. A first node, comprising:
a memory to store data of the first node; and
a processing device operatively coupled to the memory, the processing device to:
send registration information to a second node in response to joining a node cluster of a data grid;
receive, from the second node, a filter defined by search criteria of a search query for data in the node cluster;
receive data to enter into the memory in response to a memory capacity level of a third node in the node cluster exceeding a threshold memory capacity level;
determine when the data matches the filter; and
communicate, to the second node, the data from the memory when the data matches the filter.

12. The first node of claim 11, wherein the registration information is topology information indicating that the first node has joined the node cluster during the search query.

13. The first node of claim 12, wherein the registration information comprises topology update information to enable the second node to update topology information of the node cluster to include the first node.

14. The first node of claim 11, wherein the send, receive, and communicate occur during an iteration period of the search query.

15. The first node of claim 11, wherein the processing device is further to join the node cluster by:
sending a join cluster request to a cluster manager of the node cluster requesting to join the node cluster; and
receiving, from the cluster manager, an acceptance message in response to the join cluster request, wherein the acceptance message indicates that the first node is authorized the node cluster.

16. The first node of claim 11, wherein the processing device is further to receive data forwarded from the second node or another node in the node cluster in response to a memory level of the second node or the other node exceeding a threshold capacity level.

17. The first node of claim 16, wherein the processing device is further to receive data stored at the second node or the other node after the search query has completed.

18. A method comprising:
receiving, at a first node, data from a second node that is filtered using a filter during a search query of a node cluster, wherein the filter is defined by search criteria of a search query;
receiving, at the first node, queued update information from the second node, wherein the queued update information comprises information of changes to the filtered data maintained in a queue at the second node during the search query;
determining, at the first node, that a third node has joined the node cluster during the search query; and
communicating the filter to the third node joining the node cluster in response to the third node joining the cluster.

19. The method of claim 18, wherein the method further comprises:
receiving memory entry data from the third node, wherein:
the memory entry data comprises data forwarded from the second node, and
the memory entry data is filtered using the filter; and determining, at the first node, search results using the filtered data and queued data from the second node and the memory entry data from the third node;

receiving, at the first node, data from a fourth node; and receiving queued update information from the fourth node, wherein the queued update information comprises information of changes to filtered data maintained in a queue at a second node.

20. The method of claim 18, wherein the communicating and determining occur during an iteration period of the search query.

* * * * *